US011345257B2

(12) United States Patent
Oda et al.

(10) Patent No.: US 11,345,257 B2
(45) Date of Patent: May 31, 2022

(54) POWER SUPPLY DEVICE FOR VEHICLE SEAT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kota Oda, Yokkaichi (JP); Takeshi Uraki, Yokkaichi (JP); Satoshi Yamamoto, Yokkaichi (JP); Yasuyuki Yamamoto, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 16/964,322

(22) PCT Filed: Jan. 16, 2019

(86) PCT No.: PCT/JP2019/000980
§ 371 (c)(1),
(2) Date: Jul. 23, 2020

(87) PCT Pub. No.: WO2019/146455
PCT Pub. Date: Aug. 1, 2019

(65) Prior Publication Data
US 2020/0346562 A1 Nov. 5, 2020

(30) Foreign Application Priority Data
Jan. 23, 2018 (JP) .............................. JP2018-009176

(51) Int. Cl.
*B60N 2/02* (2006.01)
*H02J 50/10* (2016.01)
(Continued)

(52) U.S. Cl.
CPC .......... *B60N 2/0232* (2013.01); *B60R 16/033* (2013.01); *H02J 7/007182* (2020.01); *H02J 50/10* (2016.02); *B60N 2002/0236* (2013.01)

(58) Field of Classification Search
CPC ........... B60N 2/0232; B60N 2002/0236; H02J 50/10; H02J 7/007182; B60R 16/033
(Continued)

(56) References Cited

U.S. PATENT DOCUMENTS 5,890,779 A * 4/1999 Blackburn ........... B60N 2/0224
307/10.1
6,195,603 B1 * 2/2001 Gauger .................. B60N 2/067
296/68.1
(Continued)

FOREIGN PATENT DOCUMENTS

JP 2006-056440 A 3/2006
JP 2015-134513 A 7/2015

OTHER PUBLICATIONS

International Search Report, Application No. PCT/JP2019/000980, dated Apr. 16, 2019. ISA/Japan Patent Office.

*Primary Examiner* — Alfonso Perez Borroto
(74) *Attorney, Agent, or Firm* — Honigman LLP

(57) ABSTRACT

A power supply device for a vehicle seat, including: a power receiving unit that is provided in a vehicle seat and is connected to a plurality of loads in the vehicle seat; a power transmitting unit that contactlessly transmits power to the power receiving unit; and a power storage unit that is provided in the vehicle seat, is connected to the loads, and
(Continued)

is charged via a power supply path formed by the power receiving unit and the power transmitting unit.

7 Claims, 5 Drawing Sheets

(51) Int. Cl.
*H02J 7/00* (2006.01)
*B60R 16/033* (2006.01)

(58) Field of Classification Search
USPC .......................................................... 307/9.1
See application file for complete search history.

(56) References Cited

U.S. PATENT DOCUMENTS

| | | | | |
|---|---|---|---|---|
| 2006/0220600 A1* | 10/2006 | Greene | ................ | B60N 2/0232 |
| | | | | 318/126 |
| 2007/0221429 A1* | 9/2007 | Fukui | .................. | B60N 2/0228 |
| | | | | 180/273 |
| 2014/0265948 A1* | 9/2014 | Kaizo | .................... | H02P 6/005 |
| | | | | 318/139 |
| 2017/0288582 A1* | 10/2017 | Jordan | ...................... | H02P 6/18 |
| 2018/0029546 A1* | 2/2018 | Mohrmann | ............... | H02J 1/08 |
| 2018/0287529 A1* | 10/2018 | Yun | ...................... | H02P 7/0094 |

* cited by examiner

FIG. 3

|  | Supply power > load power | Supply power = load power | Supply power < load power |
|---|---|---|---|
| Storage voltage < predetermined value | Charged state<br><br>Note: disconnected state when fully charged | Disconnected state | Disconnected state |
| Storage voltage = predetermined value | | Discharging state or disconnected state | Discharging state |
| Storage voltage > predetermined value | | Discharging state or disconnected state | Discharging state |

FIG. 4

| Load | Power consumption (W) | Priority |
|---|---|---|
| Seat ECU (second seat ECU) | a | 0 |
| Power seat (sliding motor) | b | 1 |
| Power seat (reclining motor) | c | 2 |
| Seat air conditioner (blower fan) | d | 3 |
| Seat air conditioner (peltier element) | e | 4 |

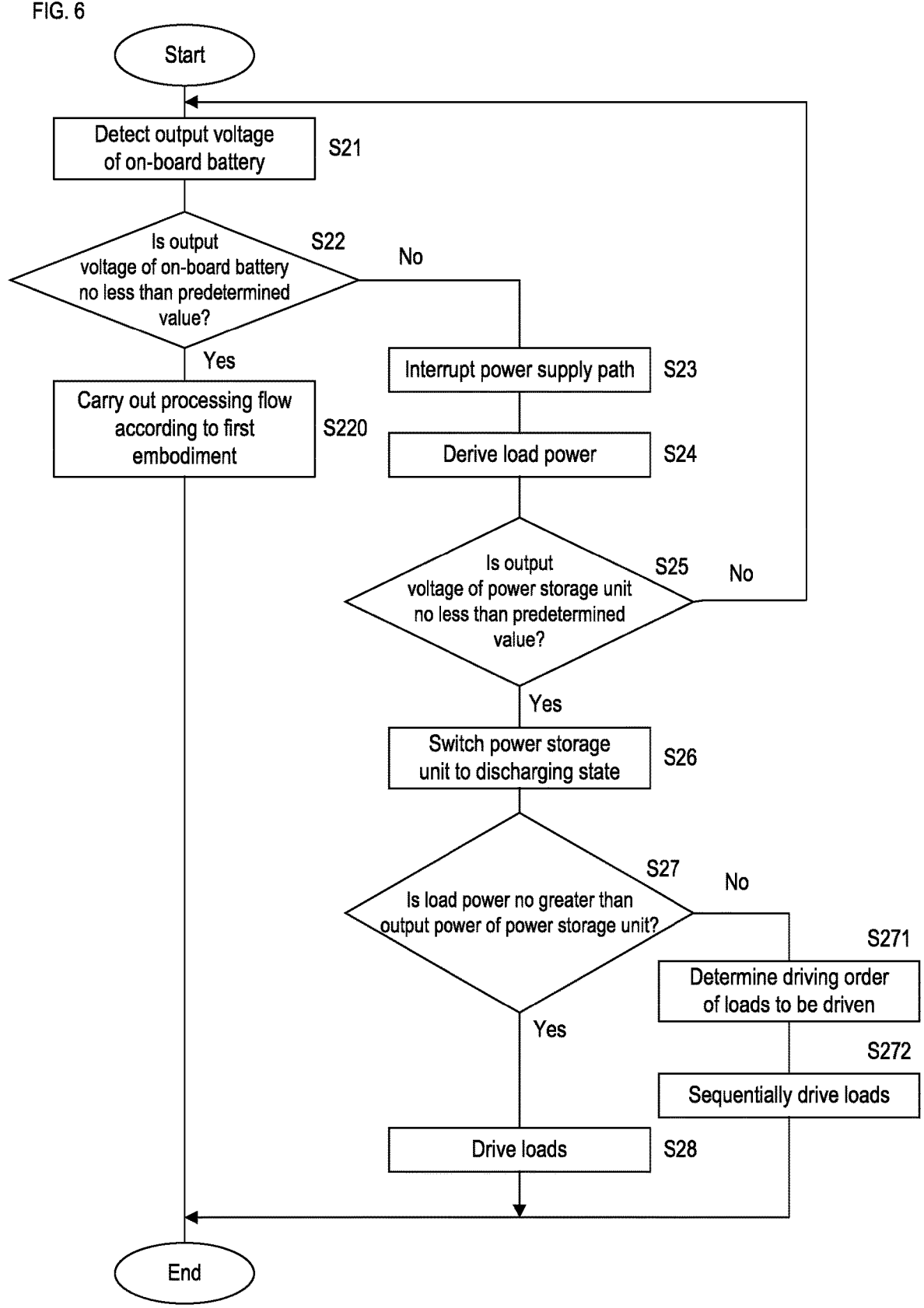

POWER SUPPLY DEVICE FOR VEHICLE SEAT

CROSS-REFERENCE TO RELATED APPLICATIONS

This application is the U.S. national stage of PCT/JP2019/000980 filed on Jan. 16, 2019, which claims priority of Japanese Patent Application No. JP 2018-009176 filed on Jan. 23, 2018, the contents of which are incorporated herein.

TECHNICAL FIELD

The present disclosure relates to a power supply device for a vehicle seat.

BACKGROUND

A vehicle seat provided in a vehicle is configured to be able to move, e.g. slide, on a rail provided on a floor portion of the vehicle body. A power supply device for a vehicle seat, which includes a power receiving coil provided in the vehicle seat, and a power supply coil provided in the floor portion of the vehicle body, is known as a device for supplying power to a drive unit such as a motor for moving the vehicle seat (e.g. JP 2015-134513A).

The power supply device for a vehicle seat disclosed in JP 2015-134513A includes a plurality of power receiving coils, and the plurality of power receiving coils are provided in a seat portion, and an armrest or a headrest, of a vehicle seat. The power supply coil is connected to an on-board battery via a DC/AC converter. The power supply coil supplies power to the power receiving coils provided in the seat portion, and power is supplied to the power receiving coils provided in the armrest or the headrest via the power receiving coils provided in the seat portion.

A vehicle seat is provided with not only a motor for moving the vehicle seat, but also a plurality of loads. Therefore, when the plurality of loads are to be driven simultaneously, there is the problem in that power that the power supply device disclosed in JP 2015-134513A can supply may be insufficient relative to the power required to drive the plurality of loads at the same time.

The present disclosure aims to provide a power supply device for a vehicle seat that can supply power for a plurality of loads that are provided in a seat when power is to be contactlessly supplied to the loads provided in the seat.

SUMMARY

A power supply device for a vehicle seat according to one aspect of the present disclosure includes: a power receiving unit that is provided in a vehicle seat and is connected to a plurality of loads in the vehicle seat; a power transmitting unit that contactlessly transmits power to the power receiving unit; and a power storage unit that is provided in the vehicle seat, is connected to the loads, and is charged via a power supply path formed by the power receiving unit and the power transmitting unit.

First, aspects of the present disclosure will be listed and described. At least some of the embodiments described below may be combined in any manner.

A power supply device for a vehicle seat according to one aspect of the present disclosure includes: a power receiving unit that is provided in a vehicle seat and is connected to a plurality of loads in the vehicle seat; a power transmitting unit that contactlessly transmits power to the power receiving unit; and a power storage unit that is provided in the vehicle seat, is connected to the loads, and is charged via a power supply path formed by the power receiving unit and the power transmitting unit.

In this aspect, the power storage unit provided in the vehicle seat is connected to the loads, and therefore it is possible to supply power from the power storage unit to the loads. Thus, it is possible to supply necessary power to the loads, using the power supplied from the power transmitting unit and the power supplied from the power storage unit.

It is preferable to employ a configuration that further includes a switching unit that is provided between the power receiving unit and the power storage unit, and in which the power storage unit is switched by the switching unit to a charged state in which the power storage unit is charged via the power supply path or a discharging state in which the power storage unit supplies power to the loads.

In this aspect, the switching unit switches the power storage unit to the charged state or the discharging state, and thus it is possible to efficiently charge and discharge the power storage unit.

It is preferable to employ a configuration that further includes: a load power deriving unit that derives load power for driving the loads; and a supply power detection unit that detects supply power supplied via the power supply path, and in which the switching unit switches the power storage unit to the charged state or the discharging state based on the load power derived by the load power deriving unit and the supply power detected by the supply power detection unit.

In this aspect, the switching unit switches the power storage unit to the charged state or the discharging state based on the load power and the supply power. Therefore, it is possible to efficiently charge or discharge the power storage unit.

It is preferable to employ a configuration in which the switching unit switches the power storage unit to the discharging state when the load power is greater than the supply power, and switches the power storage unit to the charged state when the load power is no greater than the supply power.

In this aspect, the switching unit switches the power storage unit to the discharging state when the load power is greater than the supply power, and switches the power storage unit to the charged state when the load power is no greater than the supply power. Therefore, it is possible to appropriately charge or discharge the power storage unit.

It is preferable to employ a configuration that further includes an output voltage detection unit that detects an output voltage of the power storage unit, and in which the switching unit switches the power storage unit to the charged state or the discharging state based on the output voltage detected by the output voltage detection unit.

In this aspect, the switching unit switches the power storage unit to the charged state or the discharging state based on the output voltage of the power storage unit. Therefore, it is possible to appropriately charge or discharge the power storage unit.

It is preferable to employ a configuration in which the switching unit switches the power storage unit to the charged state when the output voltage of the power storage unit is no greater than a predetermined value.

In this aspect, the switching unit switches the power storage unit to the charged state when the output voltage of the power storage unit is no greater than the predetermined value. Therefore, it is possible to prevent the power storage unit from being overdischarged.

It is preferable to employ a configuration that further includes: a load power deriving unit that derives load power for driving the loads; a supply power detection unit that detects supply power supplied via the power supply path; an output power detection unit that detects an output power of the power storage unit; and a control unit that performs control to drive the loads with different timings so that, when the load power is greater than the sum of the supply power and the output power, the load power of one or more loads that are to be driven simultaneously of the plurality of loads will be less than the sum of powers.

In this aspect, when the load power is greater than the sum of the supply power and the output power, the control unit varies the timings of driving the loads so that the load power of one or more loads that are to be driven simultaneously will be less than the sum of powers. Thus, it is possible to drive these loads.

It is preferable to employ a configuration in which, when the load power is greater than the sum of the supply power and the output power, the control unit performs control to sequentially drive the loads based on driving priorities respectively given to the loads.

In this aspect, when the load power is greater than the sum of the supply power and the output power, the control unit performs control to sequentially drive the loads based on driving priorities respectively given to the loads. Therefore, it is possible to reduce the load power of the loads to be driven simultaneously so as to be no greater than the sum of powers, and drive these loads.

It is preferable to employ a configuration that further includes: a second output voltage detection unit that detects an output voltage of an on-board battery that supplies power to the power transmitting unit; and a power supply stopping unit that stops power supply from the power transmitting unit to the power receiving unit when the output voltage of the on-board battery detected by the second output voltage detection unit is no greater than a predetermined value.

In this aspect, when the output voltage of the on-board battery that supplies power to the power transmitting unit is no greater than a predetermined value, the power supply stopping unit stops supplying power from the power supply unit to the power receiving unit. Therefore, it is possible to prevent the on-board battery from being overdischarged, and drive the loads by supplying power from the power storage unit to the loads.

Advantageous Effects of the Present Disclosure

According to one aspect of the present disclosure, it is possible to supply power for a plurality of loads that are provided in a vehicle seat when power is to be contactlessly supplied to the loads provided in the seat.

BRIEF DESCRIPTION OF DRAWINGS

FIG. 3 is a diagram illustrating examples of state transitions of charging and discharging of a power storage unit.

FIG. 4 is a diagram illustrating an example of a load table for loads.

FIG. 6 is a flowchart showing processing that is performed by a second control unit according to a second embodiment (an output voltage from an on-board battery).

DETAILED DESCRIPTION OF PREFERRED EMBODIMENTS

The present disclosure will be described based on drawings that illustrate embodiments of the present disclosure. A power supply device K according to an embodiment of the present disclosure will be described with reference to the drawings. Note that the present disclosure is not limited to the examples, but is defined by the claims, and all modifications equivalent to and within the scope of the claims are intended to be encompassed.

First Embodiment

Figure 1:
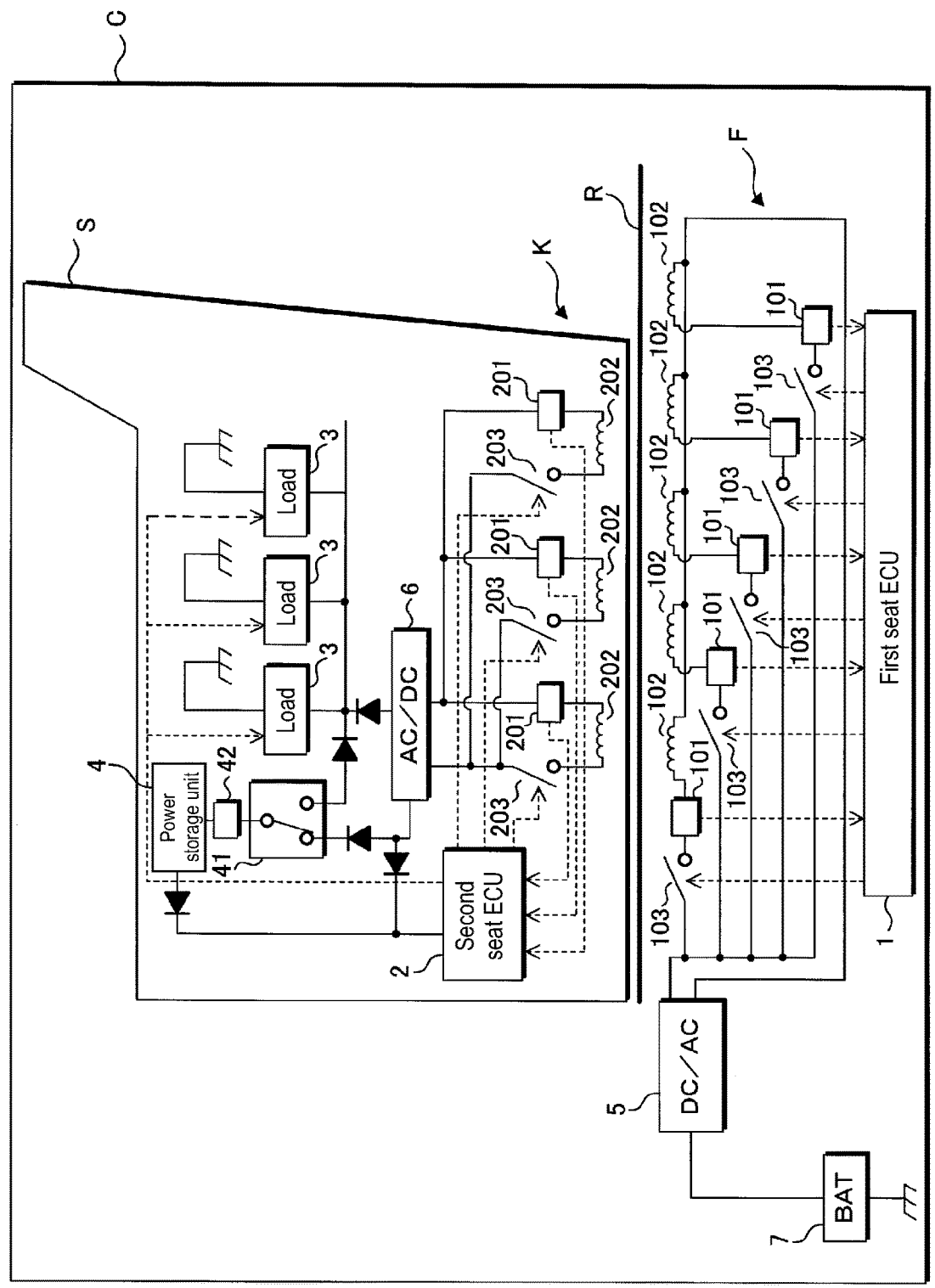
FIG. 1 is a schematic diagram showing a configuration of a power supply system for a vehicle seat according to a first embodiment.
Figure 2:
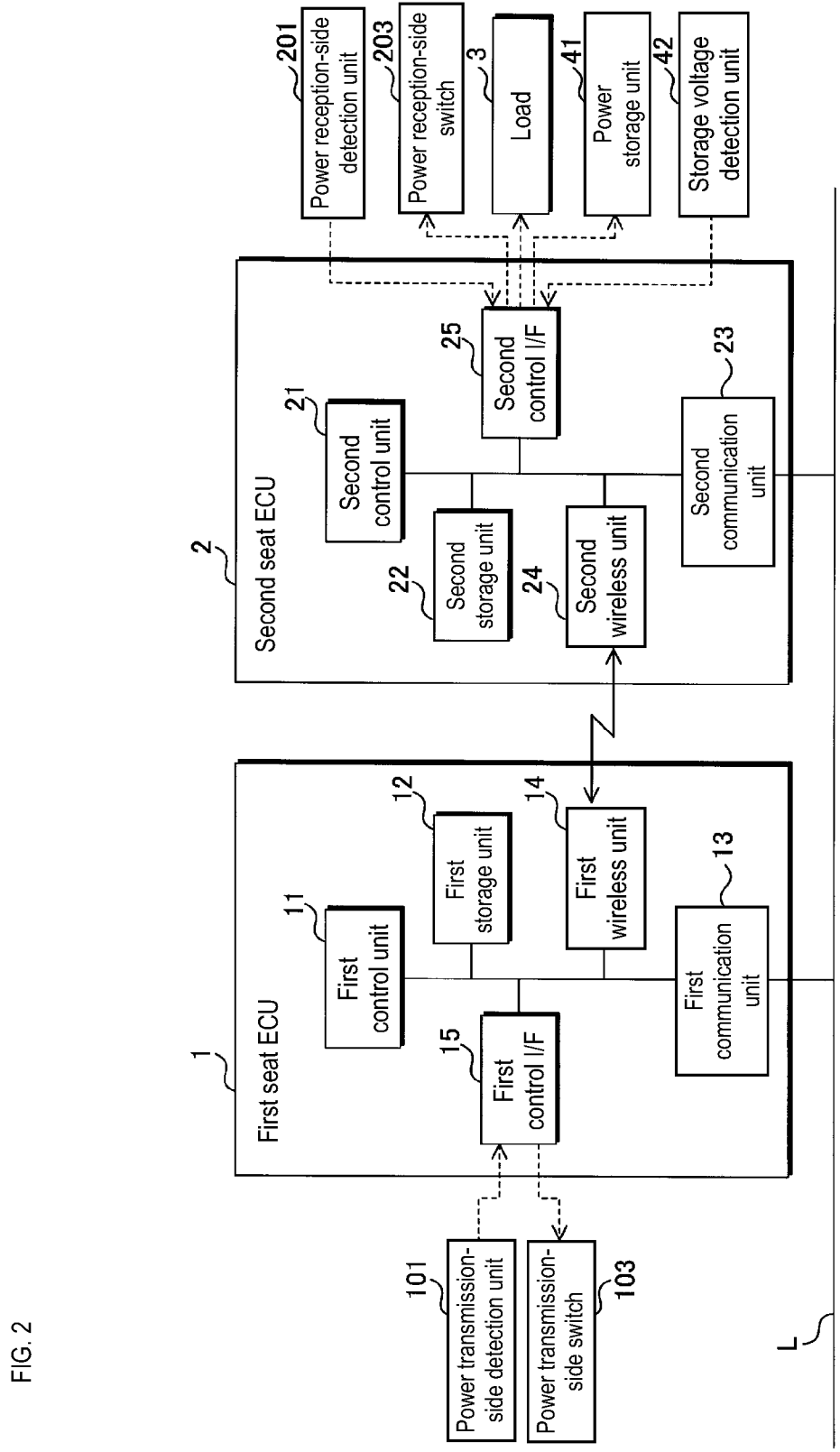
FIG. 2 is a block diagram showing a configuration of a power supply device for a vehicle seat according to the first embodiment.

The following describes an embodiment based on the drawings. FIG. 1 is a schematic diagram showing a configuration of a power supply system for a vehicle seat according to a first embodiment. FIG. 2 is a block diagram showing a configuration of the power supply device K for a vehicle seat according to the first embodiment. A power supply system is mounted in a vehicle C, and is provided with: a power transmitting unit that includes a first seat ECU 1 that is provided in a vehicle body floor F, and a plurality of power transmission coils 102; and a power receiving unit that includes a second seat ECU 2 that is provided in a seat S, and a plurality of power receiving coils 202.

The seat S is provided with a plurality of loads 3, such as a drive unit, which is a motor for sliding the seat S, or a reclining motor for tilting the backrest portion of the seat S, or a seat heater that changes the surface temperature of the seat S, for example. The seat S is a slidable seat for a vehicle, which is configured to move along a rail R that is provided in the vehicle body floor F, under the control of the second seat ECU 2 described below. The rail R is not limited to having an I-like linear shape, and may include a curved portion such as a J-shaped or U-shaped portion, for example. In particular, in a vehicle C in which an automated driving technology is implemented, the seat S provided in a front portion of the vehicle C need not invariably face forward, and may be guided along a J-shaped rail R and moved so as to face rearward, for example.

The plurality of power transmitting coils 102 are provided in the vicinity of the rail R according to the arrangement of the rail R so as to extend along the rail R. Alternatively, the plurality of power transmitting coils 102 may be provided inside the rail R. The plurality of power transmitting coils 102 are connected in parallel with each other, and both ends of each are connected to a DC/AC converter 5. The DC/AC converter 5 is connected to an on-board battery 7, converts a DC voltage output from the on-board battery 7 to an AC voltage, and outputs the converted AC voltage to each of the plurality of power transmitting coils 102. It is not necessary that only one DC/AC converter 5 is provided, and a plurality of DC/AC converters 5 may be provided. If a plurality of DC/AC converters 5 are provided, the plurality of power transmitting coils 102 may be classified into the same number of groups as the number of DC/AC converters 5, and the power transmitting coils 102 of each group may be connected to one of the DC/AC converters 5.

A power transmission-side switch 103 is provided between the DC/AC converter 5 and each of the plurality of power transmitting coils 102. Each power transmission-side switch 103 is a semiconductor switch such as an n-type FET, for example. Alternatively, each power transmission-side switch 103 may be a mechanical relay. Upon a power transmission-side switch 103 being turned ON or OFF, the DC/AC converter 5 and a power transmitting coil 102 are connected to or disconnected from each other.

Each of the power transmitting coils 102 is provided with a power transmission-side detection unit 101 that detects a value related to the power output from the power transmitting coil 102, such as the voltage value, the current value, the power value, the magnetic flux density, or the like of the power transmitting coil 102. Each power transmission-side detection unit 101 is constituted by a shunt resistor or a Hall element, for example.

The first seat ECU 1 acquires the results of detection output from the power transmission-side detection units 101, and also controls ON and OFF of the supply of the AC voltage output from the DC/AC converter 5 to the power transmitting coils 102 by turning the power transmission-side switches 103 ON and OFF.

The plurality of power receiving coils 202 are provided inside the seat S at predetermined intervals. These power receiving coils 202 are preferably provided below a seat portion of the seat S so that the distance to the vehicle body floor F, i.e. the distance to the power transmitting coils 102 is short. The plurality of power receiving coils 202 are connected in parallel with each other, and both ends of each are connected to an AC/DC converter 6. The AC/DC converter 6 is connected to the plurality of loads 3 that are connected in parallel with each other, and converts AC voltages received by the power receiving coils 202 to a DC voltage, and outputs the converted DC voltage to the plurality of loads 3. It is not necessary that only one AC/DC converter 6 is provided, and a plurality of AC/DC converters 6 may be provided. If a plurality of AC/DC converters 6 are provided, the plurality of power receiving coils 202 may be classified into the same number of groups as the number of AC/DC converters 6, and the power receiving coils 202 of each group may be connected to one of the AC/DC converters 6.

A power reception-side switch 203 is provided between the AC/DC converter 6 and each of the plurality of power receiving coils 202. Each power reception-side switch 203 is a semiconductor switch such as an n-type FET, for example. Alternatively, each power reception-side switches 203 may be a mechanical relay. Upon a power reception-side switch 203 being turned ON or OFF, the AC/DC converter 6 and a power receiving coil 202 are connected to or disconnected from each other.

Each of the power receiving coils 202 is provided with a power reception-side detection unit 201 that detects a value related to the power received by the power receiving coil 202, such as the voltage value, the current value, the power value, the magnetic flux density, or the like of the power receiving coil 202. Each power reception-side detection unit 201 is constituted by a shunt resistor or a Hall element, for example.

The second seat ECU 2 acquires the results of detection output from the power reception-side detection unit 201, and also connects different power receiving coils 202 to the AC/DC converter 6 by turning each of the power reception-side switches 203 ON and OFF. A power receiving coil 202 that is connected to the AC/DC converter 6 is a power receiving coil 202 to which power is transmitted from a power transmitting coil 102.

The first seat ECU 1 communicates with the second seat ECU 2 based on an instruction signal from a body ECU (not shown) that controls the vehicle C overall, for example, and the second seat ECU 2 performs control to drive the loads 3 provided in the seat S.

A power storage unit 4 is provided in the seat S. The power storage unit 4 is a device for storing power, which is, for example, a battery such as a lithium ion battery, or a capacitor or the like. The output voltage (rated value) of the power storage unit 4 when fully charged is set so to be substantially the same as the output voltage of the on-board battery 7, and is approximately 12V, for example. The power storage unit 4 is connected to the AC/DC converter 6 via a power storage unit switch 41, and is charged with a DC voltage output from the AC/DC converter 6.

The power storage unit switch 41 is configured to connect the power storage unit 4 and the loads 3 to each other. That is to say, the power storage unit 4 is configured to be switched by the power storage unit switch 41, to a charged state in which the power storage unit 4 is connected to the AC/DC converter 6, and a discharging state in which the power storage unit 4 is connected to the loads 3. The power storage unit switch 41 is also configured to switch the power storage unit 4 to a state in which the power storage unit 4 is not connected to the loads 3 or the AC/DC converter 6, i.e. a disconnected state. Therefore, upon the power storage unit switch 41 being switched, the power storage unit 4 is switched to the charged state, the discharging state, or the disconnected state. The power storage unit switch 41 is constituted by a mechanical relay or a semiconductor switch such as an n-type FET, for example. Regarding the connection to the second seat ECU 2, the power storage unit 4 may be connected directly to the second seat ECU 2 without the power storage unit switch 41 being interposed therebetween, and the second seat ECU 2 may be invariably supplied with power from the power storage unit 4. If the second seat ECU 2 and the power storage unit 4 are invariably connected to each other, the second seat ECU 2 can be continuously driven even when power supply from the power supply path is interrupted.

A storage voltage detection unit 42 is provided between the power storage unit 4 and the power storage unit switch 41. The storage voltage detected by the storage voltage detection unit 42, i.e. the value of a voltage that the power storage unit 4 can output, is output to the second seat ECU 2. The second seat ECU 2 controls the switching of the power storage unit switch 41 based on the acquired storage voltage or the like, and performs the charging of the power storage unit 4, discharging from the power storage unit 4 to the loads 3 (the output of power), or control to disconnect the power storage unit 4.

FIG. 3 is a diagram illustrating examples of state transitions of charging and discharging of the power storage unit 4. A predetermined value is set to the power storage unit in order to prevent overdischarge, and the predetermined value is stored in a predetermined storage area such as a second storage unit 22 of the second seat ECU 2 described below. The predetermined value for preventing overdischarge may be, for example, a discharge cut-off voltage that is determined based on the battery characteristics or the like of the power storage unit 4, or a value determined based on the discharge cut-off voltage, e.g. a value that is approximately 1.1 times the discharge cut-off voltage. As shown in FIG. 3, if the supply power supplied via the power supply path is greater than a load power that is the sum of the power consumptions of the loads 3 to be driven, and the power storage unit 4 is not fully charged, then the power storage unit 4 is switched to a charged state. If the supply power is greater than the load power and the power storage unit 4 is fully charged, the power storage unit 4 may be in a disconnected state. If the storage voltage is less than the predetermined value, and the supply power is no greater than the load power, the power storage unit 4 is switched to a disconnected state. If the storage voltage is no less than the predetermined value, and the supply power is no greater than the load power, the power storage unit 4 is switched to a discharging state. If the storage voltage is no less than the predetermined value and the supply power and the load power are the same, the power storage unit 4 may be in a disconnected state. The storage voltage, which is the output voltage of the power storage unit 4, is related to the remaining storage power of the power storage unit 4, and the power storage unit 4 can be appropriately charged and discharged based on the storage voltage of the power storage unit 4 and the magnitude relationship between the supply power and the load power.

The first seat ECU 1 includes a first control unit 11, a first storage unit 12, a first communication unit 13, a first wireless unit 14, and a first control interface 15. The first control unit 11 is constituted by a CPU (Central Processing Unit) or an MPU (Micro Processing Unit), for example, and is configured to perform various kinds of control processing, computation processing, and so on by reading out and executing control programs and data that have been stored in the first storage unit 12 in advance.

The first storage unit 12 is constituted by a volatile memory element such as a RAM (Random Access Memory), or a nonvolatile memory element such as a ROM (Read Only Memory), an EEPROM (Electrically Erasable Programmable ROM), or a flash memory, and control programs and data that is to be referenced at the time of processing have been stored therein in advance. The control programs stored in the first storage unit 12 may be control programs that have been read out from a recording medium (not shown) that the power supply device K can read. Also, the control programs may have been downloaded from an external computer (not shown) that is connected to a communication network (not shown), and have been stored in the first storage unit 12.

The first communication unit 13 is an input/output interface that employs a communication protocol such as CAN (Control Area Network), LIN (Local Interconnect Network), or Ethernet (registered trademark), and intercommunicates with another ECU (not shown) such as a body ECU that is connected to an in-vehicle LAN (L).

The first wireless unit 14 performs wireless communication according to a predetermined protocol, using wireless signals in the LF band or the UHF band (the RF band). The first control unit 11 is configured to be able to communicate with the second seat ECU 2 via the first wireless unit 14. Alternatively, the first wireless unit 14 may perform wireless communication using WiFi (registered trademark), Bluetooth (registered trademark), or the like.

The first control interface 15 is connected to the power transmission-side detection units 101 and various sensors (not shown) via serial cables or the likes, and acquires the results of detection output from the power transmission-side detection units 101 and so on and transmits the results to the first control unit 11. Also, the first control interface 15 is electrically connected to the power transmission-side switches 103, and outputs signals to turn the power transmission-side switches 103 ON and OFF according to a control instruction transmitted from the first control unit 11.

The second seat ECU 2 includes a second control unit 21, the second storage unit 22, a second wireless unit 24, and a second control interface 25. The second seat ECU 2 may also include a second communication unit 23.

As with the first control unit 11, the second control unit 21 is constituted by a CPU (Central Processing Unit) or an MPU (Micro Processing Unit), for example, and is configured to perform various kinds of control processing, computation processing, and so on by reading out and executing control programs and data that have been stored in the second storage unit 22 in advance.

The second storage unit 22 has the same configuration as the first storage unit 12, and control programs and data that is to be referenced at the time of processing have been stored therein in advance. The second storage unit 22 stores data regarding priorities that are used to determine the power consumptions of the loads 3 to be driven, and the order in which the loads 3 are to be driven. Such data is stored in the form of a table (a load table/see FIG. 4) described below, for example.

The second wireless unit 24 has the same configuration as the first wireless unit 14. The second control unit 21 is configured to be able to communicate with the first seat ECU 1 via the second wireless unit 24.

The second communication unit 23 has the same configuration as the first communication unit 13. However, it is possible to employ a configuration in which communication with the first seat ECU 1 is performed using the second wireless unit 24 and the second communication unit 23 is unnecessary.

The second control interface 25 is connected to the power reception-side detection units 201, the storage voltage detection unit 42, and various sensors (not shown) via serial cables or the likes, and acquires the results of detection output from the power reception-side detection units 201, the storage voltage detection unit 42, and so on and transmits the results to the second control unit 21. The second control interface 25 is electrically connected to the power reception-side switches 203, and outputs signals to turn the power reception-side switches 203 ON and OFF according to a control instruction transmitted from the second control unit 21. The second control interface 25 is electrically connected to the power storage unit switch 41, and outputs a signal to switch the power storage unit switch 41 according to a control instruction transmitted from the second control unit 21. The second control interface 25 is electrically connected to the loads 3 provided in the seat S, and outputs signals to drive the loads 3 according to a control instruction transmitted from the second control unit 21.

The first seat ECU 1 or the second seat ECU 2 functions as a power supply path switching unit by executing a control program and turning the power transmission-side switches 103 or the power reception-side switches 203 ON and OFF. Alternatively, the first seat ECU 1 and the second seat ECU 2 may function as a power supply path switching unit by cooperate with each other to turn the power transmission-side switches 103 and the power reception-side switches 203 ON and OFF. A power supply path is formed by the power transmitting coil 102 and the power receiving coil 202 corresponding to the power transmission-side switch 103 and the power reception-side switch 203 that have been turned ON. That is to say, the power supply path switching unit switches between power supply paths.

The first control unit 11 of the first seat ECU 1 or the second control unit 21 of the second seat ECU 2 functions as a supply power detection unit that detects the power supplied from the power transmitting coil 102 and the power receiving coil 202 that form the power supply path based on the results of detection from the power transmission-side detection units 101 or the power reception-side detection unit 201, by executing a control program.

The second control unit 21 of the second seat ECU 2 functions as a control unit that drives and controls each of the plurality of loads 3 provided in the seat S, by executing a control program. The loads 3 respectively include drive switches (not shown) that are used to start driving the loads 3, and the second control unit 21 controls the driving of the loads 3 by turning the drive switches ON and OFF via the second control interface 25.

The second control unit 21 of the second seat ECU 2 functions as a load power detection unit that refers to the load table stored in the second storage unit 22 to derive the sum of the power consumptions of the loads to be driven simultaneously (the load power), by executing a control program.

FIG. 4 is a diagram illustrating an example of the load table for the loads 3. The loads 3 provided in the seat S are, as shown in FIG. 4, for example, the second seat ECU 2, a sliding motor and a reclining motor for a power seat, and a blower fan and a Peltier element for a seat air conditioner. The power consumptions for driving the loads have been determined in advance as rated values, respectively. Furthermore, priorities (driving priorities) regarding the order in which the loads are to be driven have been determined.

When the plurality of loads are to be driven simultaneously, the second control unit 21 of the second seat ECU 2 references the load table stored in the second storage unit, and derives the respective power consumptions and driving priorities of the loads. The details will be described with reference to the flowchart. The second control unit 21 drives the loads with different timings such that the sum of the power consumptions of the plurality of loads to be driven simultaneously will be no greater than the sum of the supply power and the output power of the power storage unit 4. Furthermore, the second control unit 21 may determine the order in which the loads are to be driven, based on the driving priorities, and sequentially drive the loads.

The second control unit 21 of the second seat ECU 2 functions as an output voltage detection unit and an output power detection unit that detect the output voltage and the output power of the power storage unit, based on the output voltage (the storage voltage) detected by the storage voltage detection unit 42, by executing a control program.

The first control unit 11 of the first seat ECU 1 or the second control unit 21 of the second seat ECU 2 functions as a second output power detection unit that detects the output voltage of the on-board battery 7 based on the results of detection from the power transmission-side detection units 101, by executing a control program.

When the seat S is moved to slide along the rail R according to instruction control performed by the body ECU, for example, the first control unit 11 of the first seat ECU 1 or the second control unit 21 of the second seat ECU 2 derives the position of the seat S based on the rotation speed, rotation angle, or the like of the motor for moving the seat S. The first seat ECU 1 or the second seat ECU 2 stores the derived position of the seat S in the first storage unit 12 or the second storage unit 22. That is to say, the first control unit 11 of the first seat ECU 1 or the second control unit 21 of the second seat ECU 2 functions as a seat position deriving unit that derives the position of the seat S.

Furthermore, the first storage unit 12 or the second storage unit 22 stores, for each of the positions of the seat S, a combination of the power transmitting coil 102 and the power receiving coil 202 that will be closest to each other. Such combinations may be stored as a table showing combinations of a power transmitting coil 102 and a power receiving coil 202 each corresponding to coordinates that indicate a position of the seat S, for example. Therefore, the first seat ECU 1 or the second seat ECU 2 can derive a combination of the power transmitting coil 102 and the power receiving coil 202 that will be closest to each other, based on the current position of the seat S. Regarding the electromagnetic induction caused by a power transmitting coil 102 and a power receiving coil 202, the coupling coefficient of electromagnetic induction is determined so as to be inversely proportional to the distance between the coils. That is to say, the coupling coefficient increases as the distance decreases. The power supply efficiency increases as the coupling coefficient increases.

Upon the first seat ECU 1 turning one of the power transmission-side switches 103 ON and the second seat ECU 2 turning one of the power reception-side switches 203 ON, power is contactlessly supplied from the power transmitting coil 102 connected to the power transmission-side switch 103, to the power receiving coil 202 connected to the power reception-side switch 203, through electromagnetic induction or magnetic resonance. That is to say, a power supply path is formed by the power transmitting coil 102 and the power receiving coil 202.

Each of the plurality of power transmitting coils 102 is connected to the on-board battery 7 via the DC/AC converter 5. The plurality of power receiving coils 202 are connected to the plurality of loads 3 that are connected in parallel with each other, via the AC/DC converter 6. A power supply path is formed by a combination of one of the power transmitting coils 102 and one of the power receiving coils 202. Thus, it is possible to form a plurality of power supply paths according to such combinations. Therefore, even if any of the power transmitting coils 102 or the power receiving coils 202 fails, it is possible to form a power supply path by combining another power transmitting coil 102 or power receiving coil 202, and contactlessly supplying power from the on-board battery 7 to the loads 3 provided in the seat S via the power supply path.

Due to the power storage unit 4 being provided in the seat S, even if the power supplied via the power supply path is less than the load power required to simultaneously drive the plurality of loads 3, or the power supply path is interrupted, it is possible to drive the loads 3 by using the power output from the power storage unit 4.

By switching the power storage unit 4 to the charged state, the discharging state, or the disconnected state by using the power storage unit switch 41, it is possible to appropriately charge the power storage unit 4 and prevent the power storage unit 4 from being overdischarged.

Even if the load current of the plurality of loads 3 to be driven simultaneously is large, it is possible to appropriately drive the loads 3 by driving the loads 3 with different timings and controls the load power so as to be no greater than the sum of the supply power and the output power of the power storage unit. Furthermore, by determining the order in which these loads 3 are driven and sequentially driving the plurality of loads 3, it is possible to appropriately drive the loads 3.

The first seat ECU 1 or the second seat ECU 2 specifies a power supply path that achieves a predetermined power supply efficiency, based on the results of detection from the power transmission-side detection units 101, the power reception-side detection unit 201, or both detection units, and switches to the power supply path by performing ON/OFF control on the power transmission-side switches 103 and the power reception-side switches 203. Thus, it is possible to ensure reliable power supply performance of the power transmitting coils 102 and the power receiving coils 202. Also, by switching to a power supply path with the highest power supply efficiency according to the predetermined power supply efficiency, it is possible to more efficiently supply power to the loads 3 provided in the seat S.

The first seat ECU 1 or the second seat ECU 2 derives a combination of the power transmitting coil 102 and the power receiving coil 202 that will be closest to each other, based on the current position of the seat S. The first seat ECU 1 or the second seat ECU 2 switches to the power supply path formed with the derived combination of a power transmitting coil 102 and a power receiving coil 202, thereby efficiently supplying power to the loads 3 provided in the seat S.

The first control unit 11 of the first seat ECU 1 and the second control unit 21 of the second seat ECU 2 communicate with each other via the first wireless unit 14 and the second wireless unit 24. As a result, it is unnecessary to provide a communication line between the first seat ECU 1 and the second seat ECU 2. Therefore, in the seat S in which the second seat ECU 2, the loads 3, and so on are provided, both the power supply system and the communication system can be wireless, and flexibility in moving the seat S can be improved. Note that communication between the first control unit 11 and the second control unit 21 is not limited to wireless communication, and may be wired communication via the first communication unit 13 and the second communication unit 23.

Although the first seat ECU 1 is described as being separate from the body ECU, the present disclosure is not limited to such a configuration. The first seat ECU 1 may be included in the body ECU, and the functions of the first seat ECU 1 may be achieved as some of the functions of the body ECU.

Although the first seat ECU 1 and the second seat ECU 2 are described as being separate from each other, the present disclosure is not limited to such a configuration. The second seat ECU 2 may be provided with the functions of the first seat ECU 1, and the second seat ECU 2 may perform ON/OFF control on the power transmission-side switches 103 connected to the power transmitting coils 102, via communication lines.

It is stated above that switching between power supply paths is realized by turning the power transmission-side switches 103 and the power reception-side switches 203 ON and OFF. However, the present disclosure is not limited to such a configuration. It is possible to omit either the power transmission-side switches 103 or the power reception-side switches 203, and switching between the power supply paths may be realized by turning either the switches 103 on the power transmitting coils 102 side or the switches 203 on the power receiving coils 202 side. Alternatively, the power transmitting coils 102 and the power receiving coils 202 may be invariably connected to the DC/AC converter 5 and the AC/DC converter 6, respectively, and the output voltage from the on-board battery 7 may be invariably output (applied) to the loads 3.

Figure 5:
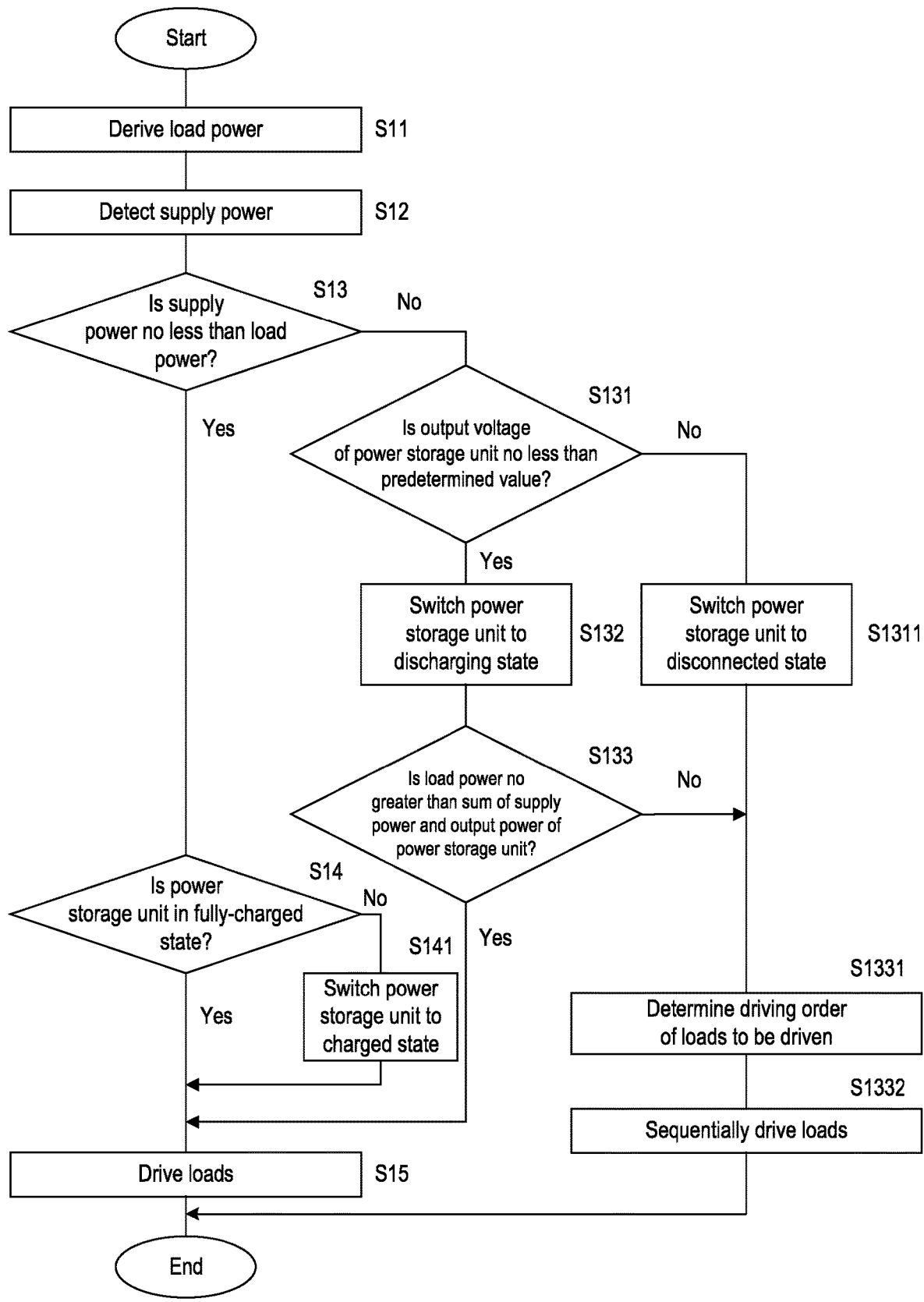
FIG. 5 is a flowchart showing processing that is performed by a second control unit according to the first embodiment (the basic form).

FIG. 5 is a flowchart showing processing that is performed by the second control unit 21 according to the first embodiment. The second control unit 21 of the second seat ECU 2 starts the following processing upon acquiring a control signal for driving the loads 3 in the seat S. Alternatively, the second control unit 21 may regularly start the following processing when a switch for starting up the vehicle such as an IG (ignition) switch is turned ON, and every time a predetermined period of time elapses thereafter. Alternatively, the second control unit 21 may start the following processing upon the movement of the seat S, i.e. upon the seat S being moved and accordingly the positional relationship between the power transmitting coils 102 and the power receiving coils 202 being changed.

The second control unit 21 derives the load power (S11). The second control unit 21 acquires a signal related to an instruction to drive the loads 3 provided in the seat S, from the body ECU, for example, via the first seat ECU 1. This signal is transmitted from the body ECU based on an operation performed by an operator of the vehicle. However, there are cases in which a plurality of loads 3 need to be operated simultaneously, such as a case in which the operator turns the seat air conditioner ON and thereafter operates the reclining power seat. Therefore, upon receiving an instruction to drive a plurality of loads 3, the second seat ECU 2 derives the sum of the power consumptions of the loads 3. When some of the loads 3 are already being driven, if the second control unit 21 receives a signal that instructs to drive yet other loads 3, the second control unit 21 derives the sum of the power consumptions of the loads 3 that are already being driven and the power consumptions of the loads 3 that are the subjects of the drive instruction. To derive this sum, the second control unit 21 references the load table stored in the predetermined storage area of the second storage unit 22 or the like, and derives the sum of the power consumptions of the subject loads 3 as the load power.

The second control unit 21 detects the supply power (S12). The second control unit 21 derives the power received by the power receiving coils 202, i.e. the supply power supplied via the power supply path, based on the results of detection from the power reception-side detection unit 201. Alternatively, the second control unit 21 may derive the supply power based on the result of detection by a power meter (not shown) that detects DC power output from the AC/DC converter 6.

The second control unit 21 determines whether or not the supply power is no less than the load power (S13). If the supply power is no less than the load power (S13: YES), it is possible to drive all of the loads 3 that are to be driven, using the supply power.

The second control unit 21 determines whether or not the power storage unit 4 is in a fully-charged state (S14). To determine whether or not the power storage unit 4 is in a fully-charged state, the second control unit 21 compares the output voltage (the discharge voltage) of the power storage unit 4 detected by the storage voltage detection unit 42 with the output voltage of the power storage unit 4 in the fully-charged state.

If the power storage unit 4 is not in a fully-charged state (S14: NO), the second control unit 21 switches the power storage unit 4 to the charged state (S141). The second control unit 21 switches the power storage unit switch 41 such that the power storage unit 4 will be connected to the AC/DC converter 6 and the power storage unit 4 will be in the charged state. The second control unit 21 drives the loads 3 to be driven (S15). The second control unit 21 starts driving each of the loads 3 by turning ON a load drive switch that is included in the load 3 or is connected in series with the load 3.

If the power storage unit 4 is in a fully-charged state (S14: YES), the second control unit 21 drives the loads 3 to be driven (S15). In this case, the second control unit 21 may switch the power storage unit switch 41 such that the power storage unit 4 will be in a disconnected state in which the power storage unit 4 is not connected to the AC/DC converter 6 or any of the loads 3. By switching the power storage unit 4 to the disconnected state, it is possible to prevent overcharging or a decrease in the amount of storage power caused by discharging to the load 3.

If the supply power is less than the load power (S13: NO), it is not possible to drive all of the loads 3 to be driven, using the supply power. The second control unit 21 determines whether or not the output voltage of the power storage unit 4 is no less than a predetermined value (S131). This predetermined value is, for example, the minimum output voltage of the power storage unit 4 required to drive the loads 3, or a predetermined voltage value that has been determined to prevent the power storage unit 4 from being overdischarged and that corresponds to the remaining power of the power storage unit 4.

If the output voltage of the power storage unit 4 is no less than the predetermined value (S131: YES), the second control unit 21 switches the power storage unit 4 to the discharging state (S132). The second control unit 21 switches the power storage unit switch 41 such that the power storage unit 4 will be connected to the loads 3, power will be supplied from the power storage unit 4 to the loads 3, and the power storage unit 4 will be in the discharging state.

The second control unit 21 determines whether or not the load power is no greater than the sum of the supply power and the output power of the power storage unit 4 (S133). If the load power is no greater than the sum of powers (S133: YES), the second control unit 21 drives the loads 3 to be driven (S15).

If the load power is not no less than the sum of powers (S133: NO), i.e. if the load power is greater than the sum of powers, the second control unit 21 determines the order in which the loads 3 to be driven are driven (S1331). Thereafter, the second control unit 21 sequentially drives the loads 3 according to the determined driving order (S1332).

If the load power is greater than the sum of powers, it is not possible to simultaneously drive the loads 3 to be driven, even if the power output from the power storage unit 4 is added to the supply power supplied from the power supply path. Therefore, the second control unit 21 refers to the load table stored in the second storage unit 22, and reads out the respective power consumptions and driving priorities of the loads 3 to be driven. Thereafter, the second control unit 21 determines the order in which the loads 3 are to be driven, according to the driving priorities, such that the sum of the power consumptions of the loads 3 to be simultaneously driven will be no greater than the sum of powers. For example, the supply power is 45 W and the output power from the power storage unit 4 is 45 W. Note that the voltages of the output powers from the supply power and the power storage unit 4 are set to approximately 12 V, for example. The loads 3 to be driven are, for example, the second seat ECU 2 (a [W]), a sliding motor (b [W]), a reclining motor (c [W]), a blower fan (d [W]), and a Peltier element (e [W]). The power consumption (the load power) when all of these loads 3 are driven is (a+b+c+d+e) [W], and if the load power is greater than the sum of powers (90 W=45 W+45 W), the Peltier element, which is given the lowest priority, is turned OFF. If the sum of the power consumptions of the loads 3 other than the Peltier element (the load power) is less than the sum of powers, the loads 3 other than the Peltier element are driven. After the driving of the sliding motor and the reclining motor for the power seat is complete, the driving of the Peltier element is started, while the blower fan is kept driving. In this way, by sequentially driving the loads 3 to be driven according to the determined driving order, i. e. by driving the loads 3 to be driven, with different timings, it is possible to drive the plurality of loads 3.

The mode of sequentially driving the loads 3 is not limited to the above mode. However, when the blower fan and the Peltier element are to be driven, these two loads 3 may be alternatingly driven such that the load power will be no greater than the sum of powers. It is stated above that, if the load power of a plurality of loads 3 is no greater than the sum of powers, the loads 3 are simultaneously driven. However, the present disclosure is not limited to such a configuration. Even if the load power of the plurality of loads 3 is no greater than the sum of powers, the loads 3 may be individually and sequentially driven according to the priorities. Needless to say, the priority set to the second seat ECU 2 is higher than the other loads 3 so that the second seat ECU 2 is to be invariably driven.

If the output voltage of the power storage unit 4 is not no less than the predetermined value (S131: NO), i.e. if the output voltage of the power storage unit 4 is less than the predetermined value, the second control unit 21 switches the power storage unit 4 to the disconnected state in which the power storage unit 4 is not connected to the AC/DC converter 6 or the loads 3 (S1311). By switching the power storage unit 4 to the disconnected state, it is possible to prevent the power storage unit 4 from being overdischarged.

As in the processing in (S133: NO), the second control unit 21 determines the driving order of the loads 3 to be driven (S1331). Thereafter, the second control unit 21 sequentially drives the loads 3 according to the determined driving order (S1332). However, the power storage unit 4 is disconnected in this case, and therefore the supply power supplied via the power supply path is the sum of powers. Thus, the upper limit of the power consumption when the loads 3 are driven is further reduced. Therefore, for example, loads 3 with power consumptions higher than the predetermined power consumption, such as the Peltier element, which has the highest power consumption, may be prohibited from being driven, and the driving priorities of the other loads 3 may be determined, and these loads 3 may be individually and sequentially driven. However, the second seat ECU 2 need be invariably driven. Therefore, while the second seat ECU 2 is being driven, the driving of the sliding motor may be started and stopped, then the driving of the reclining motor may be started and stopped, thereafter the blower fan may be driven, and thus these loads 3 may be sequentially driven.

By switching the power storage unit 4 to the charged state or the discharging state according to the magnitude relationship between the load power, which is the sum of the power consumptions of the loads 3 to be driven, and the supply power, it is possible to supply power to, and drive, the loads 3, using the power from the power storage unit 4, even if the supply power is insufficient for the load power.

By switching the power storage unit 4 to the charged state or the discharging state based on the output voltage from the power storage unit 4, it is possible to appropriately charge the power storage unit 4. Also, it is possible to prevent the power storage unit 4 from being overdischarged.

Even if the load power, which is the sum of the power consumptions of the loads 3 to be driven, is greater than the sum of powers that can be supplied to the loads 3, i.e. the sum of the supply power and the output power of the power storage unit 4, the order in which the loads 3 are to be driven is determined based on the driving priorities given to the loads 3, and the loads 3 are sequentially driven, i.e. are driven with different timings. Therefore, the sum of the power consumptions of the loads 3 to be driven simultaneously can be set to be no greater than the sum of powers, and thus the loads 3 can be driven. The loads 3 are sequentially driven according to the sum of the supply power and the output power of the power storage unit 4, and therefore the power storage unit 4 can be downsized.

In this first embodiment, the second control unit 21 of the second seat ECU 2 provided inside the seat S is described as the subject. However, the present disclosure is not limited to such a configuration. The processing according to the first embodiment may be performed by the first control unit 11 of the first seat ECU 1. Alternatively, the first control unit 11 and the second control unit 21 may communicate with each other, and thus the first control unit 11 and the second control unit 21 cooperate with each other to perform the processing according to the first embodiment.

Second Embodiment

FIG. 6 is a flowchart showing processing that is performed by the second control unit 21 according to the second embodiment. As in the first embodiment, the second control unit 21 of the second seat ECU 2 starts the following processing.

The second control unit 21 detects the output voltage of the on-board battery 7 (S21). The second control unit 21 communicates with the first control unit 11 of the first seat ECU 1, and detects the output voltage of the on-board battery 7 based on the results of detection by the power transmission-side detection units 101. The second control unit 21 may detect the output voltage of the on-board battery 7 by acquiring the result of detection by a voltage meter (not shown) that detects the output voltage of the on-board battery 7 or the DC/AC converter 5, via the first control unit 11.

The second control unit 21 determines whether or not the output voltage of the on-board battery 7 is no less than a predetermined value (S22). This predetermined value is, for example, the minimum output voltage of the on-board battery 7 required to drive the loads 3, or a predetermined voltage value that has been determined to prevent the on-board battery 7 from being overdischarged and that corresponds to the remaining power of the on-board battery 7.

If the output voltage of the on-board battery 7 is no less than the predetermined value (S22: YES), the second control unit 21 performs processing according to the same flowchart as in the first embodiment (S220).

If the output voltage of the on-board battery 7 is not no less than the predetermined value (S22: NO), i.e. if the output voltage of the on-board battery 7 is less than the predetermined value, the second control unit 21 interrupts the power supply path (S23). To interrupt the power supply path, the second control unit 21 turns OFF all of the power reception-side switches 203 to which the power receiving coils 202 are connected. Alternatively, the second control unit 21 communicates with the first control unit 11 of the first seat ECU 1 to turn OFF all of the power transmission-side switches 103 connected to the power transmitting coils 102. Alternatively, the switch of the AC/DC converter 6 may be turned OFF, or a switch (not shown) connected between the AC/DC converter 6 and the on-board battery 7 may be turned OFF.

The second control unit 21 derives the load power in the same manner as in processing S11 in the first embodiment (S24). The second control unit 21 determines whether or not the output voltage of the power storage unit 4 is no less than a predetermined value in the same manner as in processing S131 in the first embodiment (S25).

If the output voltage of the power storage unit 4 is not no less than the predetermined value (S25: NO), i.e. if the output voltage of the power storage unit 4 is less than the predetermined value, it is not possible to supply power to the loads 3 by bringing the power storage unit 4 into the discharging state. Therefore, the second control unit 21 performs loop processing in order to perform the processing in S21 again. That is to say, the second control unit 21 waits without driving the loads 3 until the output voltage of the on-board battery 7 recovers. Even in such a state, power is still continuously supplied from the power storage unit 4 to the second seat ECU 2. The power consumption of the second seat ECU 2 is mainly the power for driving the MPU of the second control unit 21, and is lower than the power consumptions of the other loads 3 such as the sliding motor. Therefore, the second seat ECU 2 is configured to be invariably supplied with power from the power storage unit 4 even when power is not supplied from the power supply path.

If the output voltage of the power storage unit 4 is no less than the predetermined value (S25: YES), the second control unit 21 switches the power storage unit 4 to the discharging state in the same manner as in processing S132 in the first embodiment (S26). The second control unit 21 performs the processing in S27, S271, S272, and S28 as in processing S133, S1331, S1332, and S15 in the first embodiment. Compared with processing S1331 and S1332, in the processing in S271 and S272, the loads 3 are driven using only the power stored in the power storage unit 4, and the upper limit of the power consumption is further reduced. Therefore, compared with a case in which power is supplied from the power supply path as in the first embodiment, more loads 3 may be set to be prohibited from being driven.

The power supply path for supplying power to the loads 3 provided in the seat S is interrupted based on the output voltage of the on-board battery 7, and thus the on-board battery 7 can be prevented from being overdischarged.

Even if it is impossible to supply power from the on-board battery 7 to the loads 3 provided in the seat S, it is possible to supply power from the power storage unit 4 to the loads 3 to drive the loads 3 by interrupting the power supply path. When the loads 3 are to be driven, the driving order of the loads 3 is determined such that the load power of the loads 3 to be driven simultaneously will be no greater than the output power of the power storage unit 4, and the loads 3 are sequentially driven. Thus, the power storage unit 4 can be downsized.

In the second embodiment, as in the first embodiment, the first control unit 11, which serves as the subject, may perform the processing according to the second embodiment, or the first control unit 11 and the second control unit 21 may cooperate with each other to perform the processing.

The embodiments disclosed herein are illustrative in all aspects, and should be considered as non-limiting. The scope of the present disclosure is not defined by the above description, but by the claims, and all modifications equivalent to and within the scope of the claims are intended to be encompassed.

The invention claimed is:

1. A power supply device for a vehicle seat, comprising:
a power receiving unit that is provided in a vehicle seat and is connected to a plurality of loads in the vehicle seat;
a power transmitting unit that contactlessly transmits power to the power receiving unit;
a power storage unit that is provided in the vehicle seat, is connected to the loads, and is charged via a power supply path formed by the power receiving unit and the power transmitting unit;
a switching unit that is provided between the power receiving unit and the power storage unit,
a load power deriving unit that derives a sum of a power consumption of the plurality of loads for driving the plurality of loads simultaneously; and
a supply power detection unit that detects supply power supplied via the power supply path, and
wherein the switching unit switches the power storage unit to the charged state or the discharging state based on the load power derived by the load power deriving unit and the supply power detected by the supply power detection unit.

2. The power supply device for a vehicle seat according to claim 1,
wherein the switching unit switches the power storage unit to the discharging state when the load power is greater than the supply power, and switches the power storage unit to the charged state when the load power is no greater than the supply power.

3. The power supply device for a vehicle seat according to claim 1, further comprising:
an output voltage detection unit that detects an output voltage of the power storage unit,
wherein the switching unit switches the power storage unit to the charged state or the discharging state based on the output voltage detected by the output voltage detection unit.

4. The power supply device for a vehicle seat according to claim 3,
wherein the switching unit switches the power storage unit to the charged state when the output voltage of the power storage unit is no greater than a predetermined value.

5. The power supply device for a vehicle seat according to claim 1, further comprising:
an output power detection unit that detects an output power of the power storage unit; and
a control unit that performs control to drive the loads with different timings so that, when the load power is greater than the sum of the supply power and the output power, the load power of one or more loads that are to be driven simultaneously of the plurality of loads will be less than the sum of powers.

6. The power supply device for a vehicle seat according to claim 5,
wherein, when the load power is greater than the sum of the supply power and the output power, the control unit performs control to sequentially drive the loads based on driving priorities respectively given to the loads.

7. The power supply device for a vehicle seat according to claim 1, further comprising:
a second output voltage detection unit that detects an output voltage of an on-board battery that supplies power to the power transmitting unit; and
a power supply stopping unit that stops power supply from the power transmitting unit to the power receiving unit when the output voltage of the on-board battery detected by the second output voltage detection unit is no greater than a predetermined value.

* * * * *